GEORGE WALTERS.

Improvement in Turn-Table for Swing-Bridges.

No. 124,400. Patented March 5, 1872.

WITNESSES.
Albert H. Norris
D. E. Castle

G. Walters
By his attys
Howson Son

124,400.

UNITED STATES PATENT OFFICE.

GEORGE WALTERS, OF PHŒNIXVILLE, PENNSYLVANIA, ASSIGNOR TO "PHŒNIX IRON COMPANY," OF SAME PLACE.

IMPROVEMENT IN TURN-TABLES FOR SWING-BRIDGES.

Specification forming part of Letters Patent No. 124,400, dated March 5, 1872.

SPECIFICATION.

I, GEORGE WALTERS, of Phœnixville, in the county of Chester, State of Pennsylvania, have invented an Improved Turn-Table for Swing-Bridges, &c., of which the following is a specification:

Nature and Object of the Invention.

My invention consists of a turn-table too fully explained hereafter to need preliminary description, the construction of the table being such as to secure strength, rigidity, and ready adjustment of the parts without excessive weight.

Description of the Accompanying Drawing.

Figure 1:
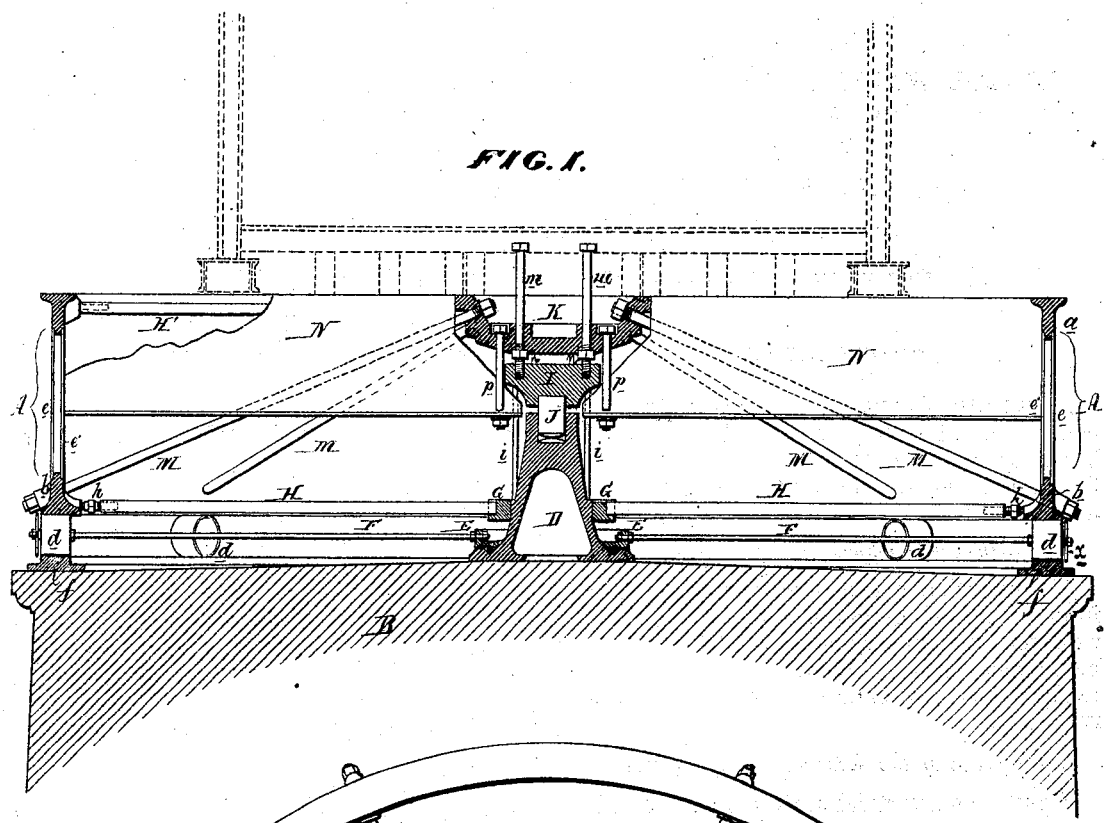
Figure 2:
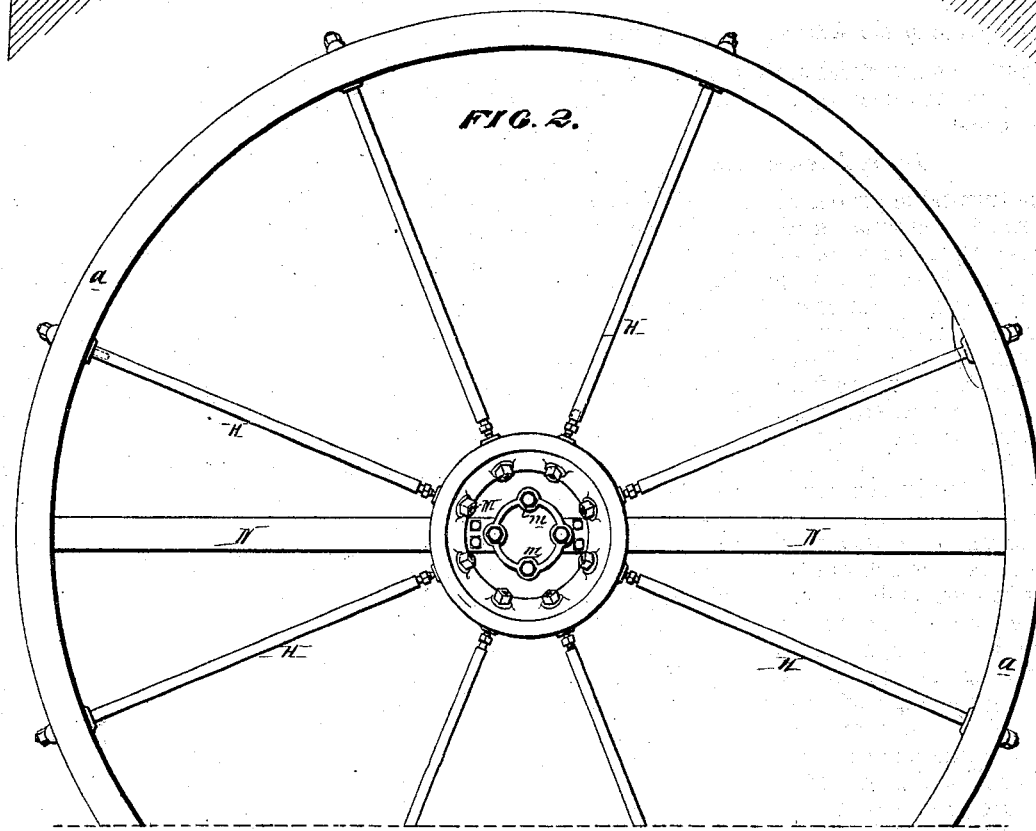

Figure 1 is a vertical section of a turn-table with my improvements; and Fig. 2, a plan view of the same.

General Description.

The turn-table proper consists of what may be termed a circular girder, A, composed, in the present instance, of an upper ring, $a$, and lower ring, $b$, the two rings being connected together by an outer casing, $e$, and inner casing, $e^1$, of plate iron, properly strengthened at intervals by suitable T-ribs; and the turn-table rests (not with its full weight, however, as explained hereafter,) on rollers $d\ d$, which bear on a circular track, $f\ f$, secured to a pier or foundation, B. D is a central pivot-stand, of cast-iron, firmly secured to the pier, and on this stand, near the base of the same, a ring, E, is arranged to turn freely, rods F, near the outer ends of which are the rollers $d$, being secured at their ends to said ring, the extreme outer ends of all the rods being connected together by a ring, $x$. An annular plate, G, is also arranged to turn freely on the pivot-stand, and from the edge of this plate to the lower ring $b$ of the circular girder A radiate an appropriate number of horizontal stays, H, which I prefer to make of wrought-iron tubes, and which are provided at one or both ends with proper means of longitudinal adjustment. In the present instance this adjustment is accomplished by set-screws, with one of which the solid outer end of each bar is provided, the outer end of each screw fitting into a socket on the ring $b$, so that each stay may be lengthened or shortened at pleasure by simply turning its screw. The annular plate G is connected to and suspended from a disk, K, (referred to hereafter,) by any appropriate number of bolts, $i\ i$. I is the pivot-head, and J is the pivot, (which I prefer to make of steel,) the pivot so fitting in a recess in the central stand D as to turn freely as well as to have a limited lateral vibration therein, concave disks (which I prefer to make of steel,) being placed in the recess of the block as bearings for the pivot. K is a substantial cast-iron disk, through which pass bolts $m\ m$, the threads of which are adapted to those of nuts $n\ n$, sunk or partly sunk into the under side of the said disk, the steel-pointed lower ends of the bolts entering recesses in the pivot-head I, and these recesses having concave steel washers for the bolts to bear on. A series of horizontal adjustable stays, H', precisely similar to the stays H below, radiate from the disk K to the upper ring $a$ of the circular girder A, and a number of diagonal tension-bars, M, pass at one end through the flange of the disk K, and, at the opposite end, through the lower ring $b$ of the circular girder A, the rods being furnished at both points with suitable nuts. N N is a transverse girder, made in two parts, as shown, each part extending from the inside of the circular girder to which it is secured to the edge of the disk K, beyond which point the lower edge of each portion projects so as to receive the bolts $p$, by which it is suspended from the disk K. The swing-bridge rests on the turn-table I have described, the lower chords or beams of the bridge (shown by dotted lines in Fig. 1,) resting on the upper edge of the circular girder, and on the transverse girders. It is most important that a swing-bridge should admit of being turned quickly and by as little exertion as possible, and this could not be done if the weight of the bridge and turn-table, or any great portion of that weight, was supported on the rollers $d$. In fact the rollers should have very little more duty to perform than that of steadying the turn-table and preventing an undue vibration of the same, the main weight being supported at the central pivot J by the pivot-stand D. Presuming that in erecting the turn-table and its bridge, in the first instance, care has been taken in adjusting the horizontal stays and tension-bars to relieve the rollers $d$ from the weight of the bridge, so that they may have none but their legitimate steadying duty to perform—that of the lateral steadying of the table—the latter will, in time, owing to the constant travel of heavy trains, be liable to sag and bear with such a weight on the rollers as to render the turning of the bridge a very difficult matter. When this occurs, all that is necessary is to turn the bolts $m$ so as to slightly elevate the disk K, and this, through the diagonal tension-rods, will necessarily elevate the outer edge of the circular girder A, and thus relieve the rollers $d$ from undue weight. If on the contrary the table has too much lateral play or vibration, a slight turn of the bolts $m\ m$ will lower the disk K, and, consequently, depress the circular girder and cause just as much of its weight and that of the superincumbent bridge to bear on the rollers as to insure proper steadiness. It will be observed in Fig. 1 that these bolts $m$ are carried upward nearly to the floor of the bridge, which is shown by dotted lines, so that they be accessible to a suitable screw-key. The adjustment of the turn-table, however, is not dependent on the bolts $m\ m$, for it will be readily seen that the adjustment of the table, as it regards its bearing on the rollers $d$, can be accomplished by the adjustment of the longitudinal rods H and H' and diagonal tension-rods M in a manner which will be readily understood without explanation; and this mode of adjustment may be adopted whenever circumstances require; but in most cases the bolts $m\ \bar{m}$ will suffice to bring about the desired result.

I have referred to my improved turn-table as being used in connection with swing-bridges, and it is especially well adapted for this use; but it can be employed with advantage on railroads and in other localities where an easy moving and substantial turn-table is required.

Although I have illustrated and described a peculiar manner of constructing the central portion of the turn-table, which portion is fully set forth and claimed in a separate application for a patent, my present application does not refer to any specific mode of constructing the said central portion, inasmuch as the tension-rods M and stays H and H' may be employed for connecting the annular girder to any central hub or vane of a turn-table.

Claims.

1. The annular girder A connected to the central hub or vane of a turn-table by stays H and adjustable diagonal tension-rods M, substantially as described.

2. The combination of the above with the stays H'.

In testimony whereof I have signed my name to this specification in the presence of two subscribing witnesses.

GEORGE WALTERS.

Witnesses:
 JNO. B. HARDING,
 HARRY SMITH.